July 4, 1933.  E. MERNIER  1,916,432
APPARATUS FOR MANUFACTURING FORGINGS
Filed Jan. 28, 1930  4 Sheets-Sheet 1
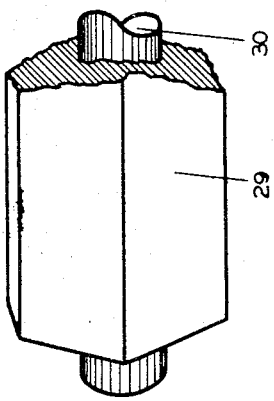
FIG. 4
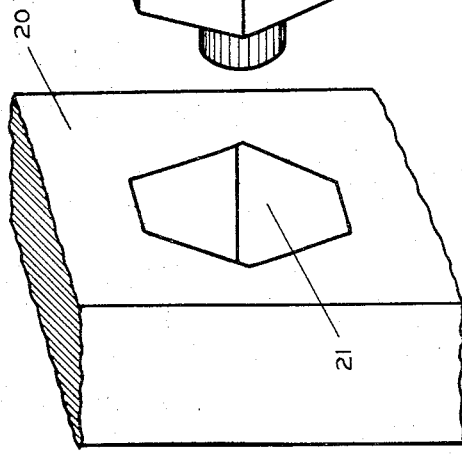
FIG. 3
FIG. 2
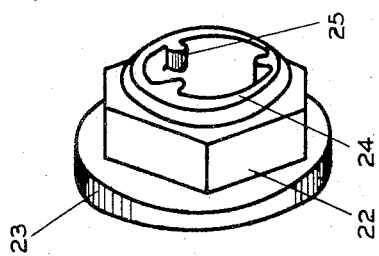
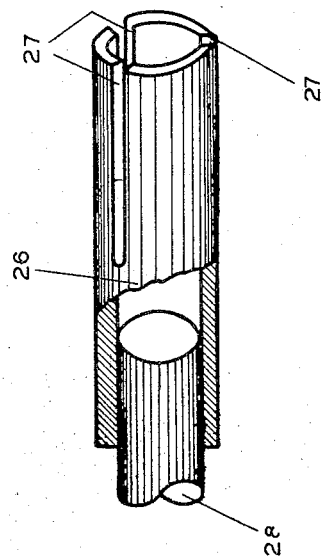
FIG. 1
EUGENE MERNIER
INVENTOR
BY F. Hutchinson.
ATTORNEY July 4, 1933.  E. MERNIER  1,916,432
APPARATUS FOR MANUFACTURING FORGINGS
Filed Jan. 28, 1930  4 Sheets-Sheet 2

EUGENE MERNIER
INVENTOR

BY *F. Hutchinson*

ATTORNEY

July 4, 1933.  E. MERNIER  1,916,432
APPARATUS FOR MANUFACTURING FORGINGS
Filed Jan. 28, 1930  4 Sheets-Sheet 4

EUGENE MERNIER
INVENTOR

BY F. Hutchinson

ATTORNEY

Patented July 4, 1933

1,916,432

UNITED STATES PATENT OFFICE

EUGENE MERNIER, OF BRAUX, FRANCE, ASSIGNOR TO INTERNATIONAL SAFETY LOCK NUT CORPORATION, A CORPORATION OF DELAWARE

APPARATUS FOR MANUFACTURING FORGINGS

Application filed January 28, 1930, Serial No. 424,070, and in Great Britain July 6, 1929.

This invention relates generally to apparatus for manufacturing forgings and particularly nut blanks and like articles, and more particularly it relates to an improved ejector tool and a detachable shaping die for this apparatus.

During the process of manufacturing forgings the forging operation may, as in the production of castellated or grooved lock nuts, involve a special shaping of the blank by the die members, and difficulty is experienced in ejecting the blank from the machine, because the blank tends to adhere to the special shaping die owing to the interlocking of the blank with the projections and recesses of the die.

One of the objects of the present invention is improved means for ejecting the blanks from the dies after they have been formed.

According to this invention the shaping die has an ejector operatively associated with it and arranged to force the blank positively from the shaped face of the die.

According to another feature of the invention the said ejector is so operatively connected with the die that its end face forms a portion of the die for shaping the blank.

According to another feature of the invention the shaping die is so mounted in the machine that it may be readily detached and a die of different form for the manufacture of a differently shaped object substituted therefor.

Other features of the invention will be hereinafter described and set forth.

One embodiment of the invention will now be described with reference to the accompanying drawings, which show the various stages in the forging operation of the blank for a special type of grooved lock nut; but it will be understood that the invention is generally applicable to forging machines of the kind referred to for forming other articles.

In the drawings comprising four sheets numbered Figures 1 to 10 inclusive, one embodiment of the invention is diagrammatically set forth.

Fig. 1 is a view, partially in section, of the ejector mechanism.

Fig. 2 is a perspective view of the detachable shaping die.

Fig. 3 is a perspective view of the matrix and matrix block.

Fig. 4 is a perspective view of another die member with certain of the parts broken away.

Figure 5:
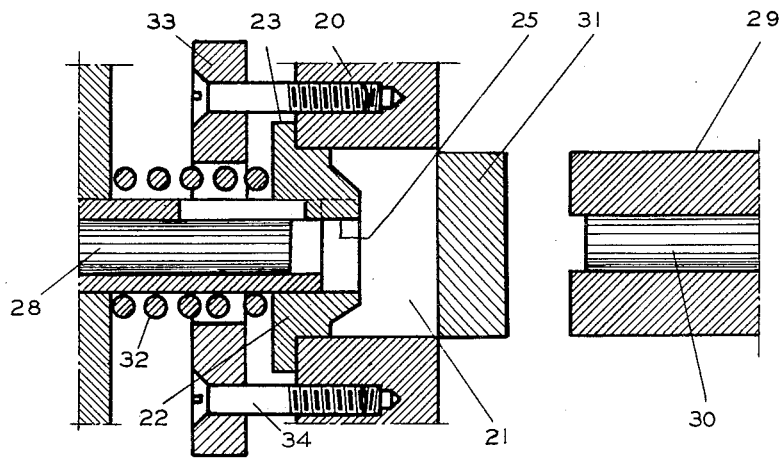

Figs. 5 to 10 inclusive are sectional views of the mechanism showing successive stages in the process of the formation of a nut blank.

Like reference characters designate corresponding parts throughout the several figures of the drawings.

Referring now to Fig. 3, element 20 indicates a stationary block having a hole 21 of polygonal cross-section (being indicated in the drawing as hexagonal) extending through it and forming the matrix. A detachable shaping die 22 (Fig. 2) is arranged to fit in one side of the hole 21. This die has a shoulder piece 23 which abuts against the block 20 when the die is in its extreme inward position (see Figs. 5, 9 and 10 inclusive), and in the example shown it is provided with an annular extension 24 on its opposite face and inwardly extending lugs 25 which are adapted to form a nut blank having a wedge-shaped groove in its base and a slotted sleeve portion between the groove and the central bore. The ejector 26 (Fig. 1) is arranged to fit within the die 22 and is provided with slots 27 to accommodate the lugs 25. A punch 28 is slidably mounted within the ejector 26, and is adapted to pierce the blank as will be hereinafter described. A second die member 29 is adapted to enter the opposite side of the matrix 21, and slidably mounted within it is a second punch 30.

Figure 6:
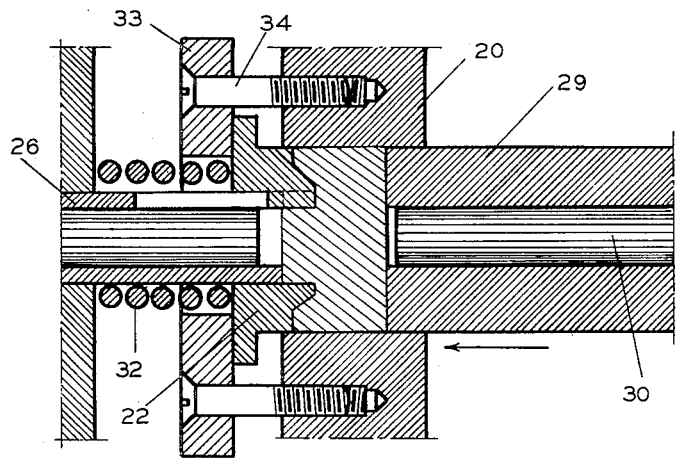

Referring now to Figs. 5 to 10, Fig. 5 illustrates the first phase in which a heated metal strip 31, from which the blanks are formed, is positioned before the matrix 21 and the die 29 is advanced to shear off a portion of the metal to form the blank, which is compressed within the matrix as shown in Fig. 6. It will be seen (Fig. 5) that the movable die 22 is held in its normal position with the shoulder 23 against the block 20 by means of the spring 32; but when the die 29 is advanced (Fig. 6), the movable die 22 acts as a buffer and the spring 32 is compressed. An adjustable stop plate 33, (shown in Figs. 5, 6, 7 and 8 but omitted for simplification from Figs. 9 and 10) supported by adjusting screws 34 is provided, to limit the extent of the movement of the die 22, so that the thickness of the blank may be regulated, the travel of the die 29 being of course predetermined by its operating devices. The metal blank is thus compressed between the dies 29 and 22 and is shaped according to the configuration of the said dies, it being observed that the end face of the ejector 26 co-operates with the die 22 to form a part thereof in the shaping operation, that is to say, the metal is forced around the lugs 25, and the face of the ejector 26 forms the inner step of the die against which the metal is compressed.

Figure 7:
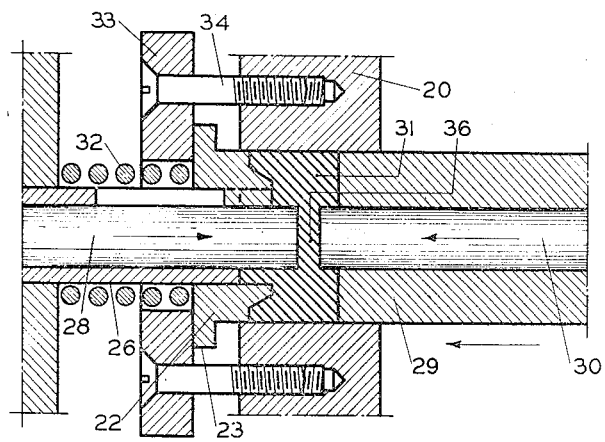

In the next stage illustrated in Fig. 7, the die 29 and the die 22 remain in the same position, while the two punches 28 and 30 are moved together simultaneously to punch the centre of the blank 31 from opposite sides, thus leaving a thin portion of metal 36 in the centre.

Figure 8:
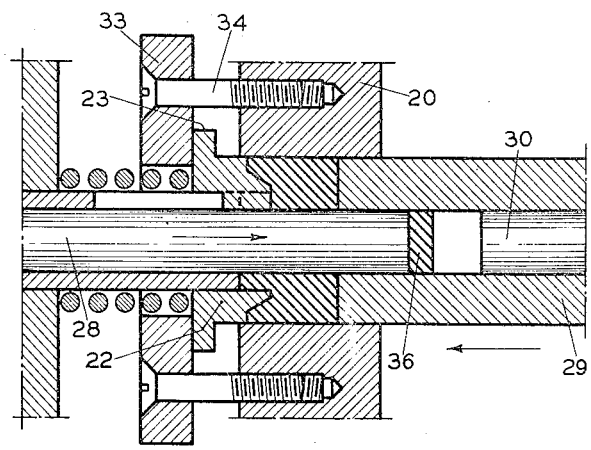

In the next stage illustrated in Fig. 8, the die 29 is still maintained in its previous position, but the punch 28 continues its travel whilst the punch 30 is withdrawn, and thus the wad of metal 36 from the centre of the blank 31 is forced onwards into the bore of the die 29.

Figure 9:
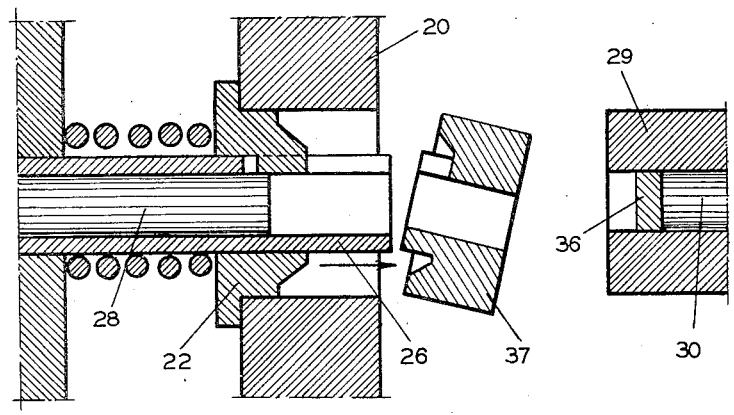
Figure 10:
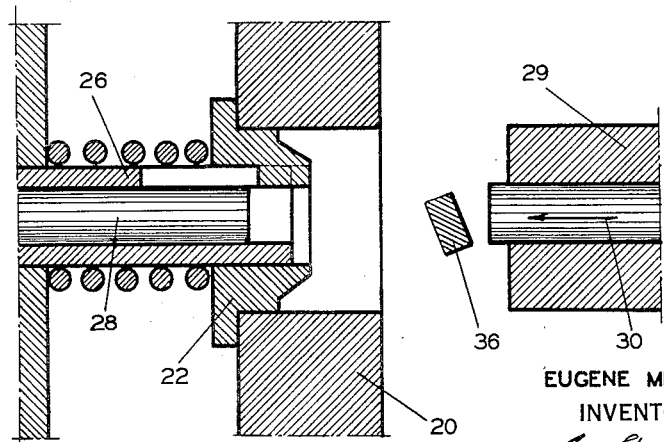

In the next stage illustrated in Fig. 9 the die 29 and the punch 28 are withdrawn, the spring 32 is released to shift the shaping die 22, and the ejector 26 is advanced through the die 22 so that the formed blank 37 is positively forced from the face of the die 22 and is finally ejected from the machine, the wad of metal 36 being meanwhile retained in the bore of the die 29. In the final stage illustrated in Fig. 10, the punch 30 advances and ejects the wad 36 from the die 29 and the ejector 26 is retracted so that on the withdrawal of the punch 30 the parts are again in readiness for the next cycle of operations.

It will be understood that any suitable mechanism may be provided for moving the parts in proper timed relationship as will be well understood by those skilled in the art, and, if required, the die 22 may be positively actuated by means of a cam, used either in addition to, or in place of, the spring 32. It will be also seen that the die 22 not being positively fixed to the plungers or other operating mechanism of the machine is readily removable and may be replaced by a die of another shape, when, for example, castellated nuts are to be formed.

Further it will be understood that by suitably shaping the matrix and the dies, the machine may be adapted for the manufacture of articles other than nuts.

What is claimed is:

1. In a forging machine, the combination of a matrix, a tubular die adapted to enter one end of said matrix, a plunger disposed within said die, a shaping die resiliently mounted in the opposite end of said matrix, a tubular ejector co-operating with said shaping die in the shaping operation, and a punch disposed within said ejector.

2. In a forging machine, the combination of a matrix, a tubular injector arranged to enter one side of said matrix, a punch disposed within said injector, a bored crowning die resiliently mounted in the opposite side of said matrix, a tubular ejector disposed within said crowning die and movable relatively to said die and said matrix, and a punch disposed within said ejector.

3. In a forging machine, the combination of a matrix, a tubular injector arranged to enter one side of said matrix, a punch disposed within said injector, a bored crowning die resiliently mounted in the opposite side of said matrix, a plurality of lugs extending inwardly from the inner surface of said crowning die, a tubular ejector provided with a plurality of longitudinal slots adapted to slide over said lugs, whereby said ejector is movable relatively to said die and said matrix, and a punch disposed within said ejector.

4. In a forging machine, the combination of a matrix, a tubular injector arranged to enter one side of said matrix, a punch disposed within said injector, a bored crowning die resiliently mounted in the opposite side of said matrix, a tubular ejector disposed within said crowning die and movable relatively to said die and said matrix, and a punch disposed within said ejector, said injector, die and ejector co-operating in the shaping of a blank within said matrix, said punches co-operating in punching a complete bore through said blank, and said ejector acting alone in forcing said blank from the face of said crowning die and ejecting it from said matrix.

5. In a nut forging machine, the combination of a matrix, a first die for inserting a blank into said matrix, a second die, co-operating with said first die, for shaping said blank, a plurality of plungers, each disposed within one of said dies, for punching a complete bore through said blank and for removing the punched portion thereof from the machine, and an ejector, slidably disposed between said second die and its associated plunger, for forcing the forged nut from the face of said second die and then ejecting it from said matrix.

6. In a nut forging machine, the combination of a matrix, a first die for inserting a blank into said matrix, a second die, co-operating with said first die, for shaping said blank, a plurality of plungers, each disposed within one of said dies, for punching a complete bore through said blank and for removing the punched portion thereof from the machine, a plurality of lugs extending inwardly from an inner surface of said second die, and an ejector, provided with a plurality of slots adapted to slide over said lugs and disposed between said second die and its associated plunger, for forcing the forged nut from the face of the second die and then ejecting it from said matrix.

7. In a forging machine, the combination of a matrix, a bored crowning die resiliently mounted in one side of said matrix, a plurality of lugs extending inwardly from the inner surface of said die, a tubular ejector provided with a plurality of longitudinal slots adapted to slide over said lugs whereby said ejector is movable relatively to both said crowning die and said matrix, and a punch disposed within said ejector.

8. In a forging machine, the combination of a matrix, a bored crowning die resiliently mounted in one side of said matrix, a tubular ejector disposed within said crowning die and movable relatively to said die and said matrix, and a punch disposed within said ejector.

9. In a forging machine, the combination of a matrix, a bored crowning die resiliently mounted in one side of said matrix, a tubular ejector disposed within said crowning die and movable relatively to said die and said matrix, said ejector co-operating with said die in the crowning operation, and a punch disposed within said ejector.

10. In a forging machine, the combination of a matrix, having mounted in one side thereof a crowning die movable into and out of said matrix, said inward and outward movements being limited respectively by a collar on said die and by an exposed stop plate adjustable to vary the extent of outward movement of said die, and an exposed spring assembly for restoring said die from its outward to its inward position, said stop plate and said spring assembly being readily removable to permit the replacement of said die.

EUGENE MERNIER.